(12) United States Patent
Ishikawa et al.

(10) Patent No.: US 6,208,785 B1
(45) Date of Patent: Mar. 27, 2001

(54) OPTICAL FIBER CABLE

(75) Inventors: Hiroki Ishikawa; Yoshiyuki Suetsugu, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/086,407

(22) Filed: May 29, 1998

(30) Foreign Application Priority Data

May 29, 1997 (JP) .................................................. 9-140010

(51) Int. Cl.[7] ...................................................... G02B 6/44
(52) U.S. Cl. ........................... 385/111; 385/100; 385/109; 385/110; 385/111; 385/112; 385/113; 385/114
(58) Field of Search ..................................... 385/111, 100, 385/114, 110, 109, 112, 113

(56) References Cited

U.S. PATENT DOCUMENTS

| | | | |
|---|---|---|---|
| 4,474,426 | 10/1984 | Yataki | 350/96.23 |
| 5,517,591 | 5/1996 | Wagman et al. | 385/110 |
| 5,630,002 | 5/1997 | Ota et al. | 385/111 |

FOREIGN PATENT DOCUMENTS

| | | |
|---|---|---|
| 62-98314 | * 7/1987 | (JP) . |
| 63-301911 | 12/1988 | (JP) . |
| 8-152545 | * 6/1996 | (JP) . |
| 8-211263 | 8/1996 | (JP) . |

OTHER PUBLICATIONS

Patent Abstracts of Japan vol. 096, No. 012, Dec. 26, 1996 & JP 08 211263 A (Furukawa Electric Co Ltd: The; Nippon Telegr & Teleph Corp < NTT&), Aug. 20, 1996.
Patent Abstracts of Japan vol. 013, No. 131 (P–850), Mar. 31, 1989 & JP 63 301911 A (Sumitomo Electric IND Ltd), Dec. 8, 1988.

* cited by examiner

Primary Examiner—Frank G. Font
Assistant Examiner—Delma R. Flores Ruiz
(74) Attorney, Agent, or Firm—Pillsbury Madison & Sutro LLP

(57) ABSTRACT

An optical fiber cable is constituted by a cylindrical spacer having on its surface helical grooves reversing their direction at a given pitch in which a stack of ribbon optical fibers is received. In the optical fiber cable, the reverse angle ø of the groove is $210° \leq ø \leq 330°$; the groove has a size to contain a virtual circle therein whose diameter D is represented by equation of $D=(W^2+(N \cdot T)^2)^{1/2}$ where W is the width of the ribbon optical fiber, T is the thickness of the ribbon optical fiber, and N is the number of the ribbon optical fibers stacked in a groove; the angle θ formed between each of side walls of the groove and a line connecting the center of the bottom of the groove and the center of the spacer varies periodically; and the angle θ of the side wall on the inner side of the curvature of the center of the groove increases continuously and monotonously at least over the part extending from a position distant from a helical portion between adjacent reverse portions at approximately 90° in a circumferential direction to the next reverse portion.

8 Claims, 8 Drawing Sheets

| | SIZE OF GROOVE (mm) | | | θ₀ (°) | A (°) | P (mm) | φ (°) | LOSS AFTER STACKING (dB) | | LOSS AFTER SHEATHING (dB) | |
|---|---|---|---|---|---|---|---|---|---|---|---|
| | BOTTOM WIDTH | TOP WIDTH | DEPTH | | | | | AVG. | MAX. | AVG. | MAX. |
| EXAMPLE 1 | 1.6 | 3.0 | 3.0 | 15 | 35 | 250 | 280 | 0.20 | 0.22 | 0.21 | 0.22 |
| COMPARA. EXAMPLE 1 | 1.6 | 3.0 | 3.0 | 15 | 0 | 250 | 280 | 0.25 | 0.26 | 0.28 | 0.45 |
| COMPARA. EXAMPLE 2 | 1.2 | 3.0 | 3.0 | 17 | 0 | 250 | 280 | 0.28 | 0.39 | 0.26 | 0.40 |

FIG. 10

| | SIZE OF GROOVE (mm) | | | | $\theta_0$ (°) | A (°) | P (mm) | $\phi$ (°) | LOSS AFTER STACKING (dB) | | LOSS AFTER SHEATHING (dB) | |
|---|---|---|---|---|---|---|---|---|---|---|---|---|
| | CURVATURE RADIUS R AT BOTTOM | TOP WIDTH | DEPTH | | | | | | AVG. | MAX. | AVG. | MAX. |
| EXAMPLE 2 | 1.0 | 3.0 | 3.0 | | 15 | 35 | 250 | 280 | 0.21 | 0.22 | 0.20 | 0.22 |
| COMPARA. EXAMPLE 3 | 0.5 | 3.0 | 3.0 | | 17 | 35 | 250 | 280 | 0.26 | 0.40 | 0.28 | 0.39 |

OPTICAL FIBER CABLE

BACKGROUND OF THE INVENTION

1. Field of the Invention

This invention relates to an optical fiber cable having a stack of a plurality of ribbon coated optical fibers.

2. Description of the Related Art

A so-called SZ type optical fiber cable is known for its structure allowing the coated optical fibers to be taken out with ease from the middle of the cable. The optical fiber cable of this type comprises a cylindrical center spacer having on its surface S- or Z-shaped helical grooves reversing their direction at a given pitch in which coated optical fibers are buried as disclosed in JP-A-63-301911 (the term "JP-A" as used herein means an unexamined Japanese patent publication). After coated optical fiber are put in the grooves, a filamentous material, such as nylon fiber, is helically wound onto the spacer at a certain pitch. The filament-wound spacer can further be wound with tape of, e.g., nonwoven fabric or covered with an aluminum layer. The winding of the filament, tape, and aluminum layer will hereinafter be inclusively referred to as a winding. A sheath is then provided around the wound spacer by extrusion coating.

A ribbon stack should be put in the groove in such a manner as to minimize strain energy due to bending or twisting. The strain energy is least when the ribbons are little twisted. JP-A-8-211263 proposes to make both width and depth of the groove greater than the length of the diagonal of a ribbon stack so that the ribbon stack may be placed therein smoothly.

In practice, however, because the ribbon stack is forced to bend along the SZ-shaped track, the inner surface of the groove restricts the ribbon stack. In other words, a mere increase in size of the groove does not allow the ribbon stack to move freely in the groove. In fact the lowermost ribbon optical fiber (of the ribbon stack) is in contact with the bottom of the groove at a helical portion between two adjacent reverse portions where the helical groove reverses its direction (hereinafter simply referred to as a helical portion), whereas the uppermost ribbon optical fiber comes into contact with the side wall of the groove on the inner side of the curvature at a reverse portion where the groove reverses its direction. The angle of twist of the ribbon optical fibers in the groove is decided by the position of the helical portion and that of the reverse portions.

A conventional technique is shown in FIGS. 11A to 11C. FIG. 11A is a perspective view of a spacer having S-shaped grooves. FIG. 11B is an enlarged cross section of one of the grooves at a helical portion. FIG. 11C is an enlarged cross section of the groove at a reverse portion. In the drawings, reference numeral 11 designates a spacer; 12, a high-tensile member; 13, an S-shaped grooves; and 14, a ribbon coated optical fiber. For the sake of better understanding, the lowermost ribbon optical fiber is blacked out, and the uppermost ribbon optical fiber is marked with crossing lines. While not shown in FIG. 11A, the spacer 11 has a plurality of grooves 13. Symbols $S_1$ and $S_2$ indicate reverse portions, and symbol $S_0$ a helical portion.

As shown in FIG. 11B, the lowermost ribbon optical fiber is in contact with the bottom of the groove at the helical portion of the helical portion between adjacent reverse portions. At the reverse portion, the uppermost ribbon optical fiber comes into contact with the side wall of the groove on the inner side of the curvature as shown in FIG. 11C. As the groove has a rectangular section, the side walls at the reverse portion are in parallel with the line connecting the center of the groove and the center of the spacer. No consideration is given to the angle of the side walls. Because of impropriety of this angle, the ribbon stack is twisted at a considerable angle per unit length. It follow that a heavy strain is imposed on the ribbon stack, which results in an increase of transmission loss.

SUMMARY OF THE INVENTION

The present invention has been completed in the light of the above-described circumstances. It is an object of the present invention to provide an optical fiber cable with a reduced transmission loss which comprises a cylindrical spacer having on its surface helical grooves reversing their direction at a given pitch in which a stack of ribbon optical fibers is buried. The above object of the invention is accomplished by specifying the angle of side walls of the grooves.

The present invention provides an optical fiber cable comprising a cylindrical spacer having on its surface helical grooves reversing their direction at a given pitch in which a stack of ribbon optical fibers is received, wherein:

the reverse angle ø of the groove is $210° \leq ø \leq 330°$ (preferably, $260° \leq ø \leq 290°$, more preferably $270° \leq ø \leq 280°$), the groove has a size to contain a virtual circle therein whose diameter D is represented by equation:

$$D=(W^1+(N \cdot T)^2)^{1/2}$$

where W is the width of the ribbon optical fiber; T is the thickness of the ribbon optical fiber; and N is the number of the ribbon optical fibers stacked in a groove, the angle θ formed between each of side walls of the groove and a line connecting the center of the bottom of the groove and the center of the spacer varies periodically, and the angle θ of the side wall on the inner side of the curvature of the center of the groove increases continuously and monotonously at least over the part extending from a position distant from a helical portion between adjacent reverse portions at approximately 90° in a circumferential direction to the next reverse portion.

It is preferable that the angle θ of the side wall on the inner side of the curvature of the center of the groove satisfies the relationship:

$$θ=θ_0+A \cdot \sin(180-(Z/P))$$

where $θ_0$ is the angle θ at the helical portion; P is a reverse pitch (i.e., the distance between adjacent reverse portions); and Z is a coordinate of the longitudinal direction of the cable, taking a helical portion as a starting point 0, at least over the part extending from a position distant from a helical portion at approximately 90° in a circumferential direction to the next reverse portion.

It is preferable that the groove at a helical portion has a nearly trapezoidal cross section whose width B at the bottom satisfies the relationship:

$$B \geq N \cdot T$$

Alternatively, it is preferable that the bottom of the grooves is part of a circle touching both right and left side walls, and the diameter C of the circle satisfies the relationship:

$$C \geq (W^2 + (N-T)^2)^{1/2}$$

BRIEF DESCRIPTION OF THE DRAWINGS

In the accompanying drawings:

FIG. 10 is a table showing test results of Example 2 according to the second embodiment and comparative examples.

PREFERRED EMBODIMENT OF THE INVENTION

Preferred embodiment of the present invention will be described in detail as follows.

Figure 1A:
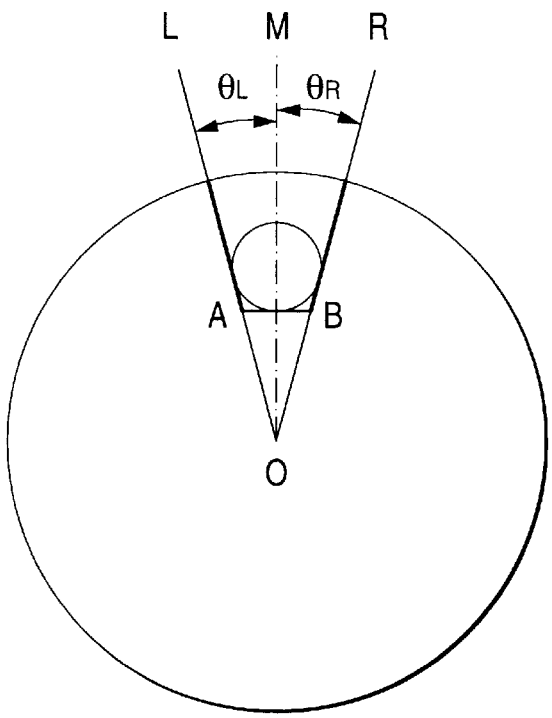
FIGS. 1A and 1B are views illustrative of the angles of side walls of a groove.

First, an explanation will be made about the angle of the side wall of a groove. FIG. 1A shows the cross section of a groove having a nearly trapezoidal section. Line OM is drawn from center O of the spacer through the center of bottom AB of the groove. Angle $\theta_L$ between line OM and line AL drawn from point A of the bottom through the left side wall is positive, measured in a clockwise direction. On the other hand, angle $\theta_R$ between line OM and line BL drawn from point B through the right side wall is positive, measured in an anticlockwise direction. Accordingly, in the case of FIG. 1A in which the left and right side walls are symmetrical, $\theta_L$ and $\theta_R$ are equally represented as $\theta_0$.

$$\therefore \theta_L = \theta_R = \theta_O$$

Figure 1B:
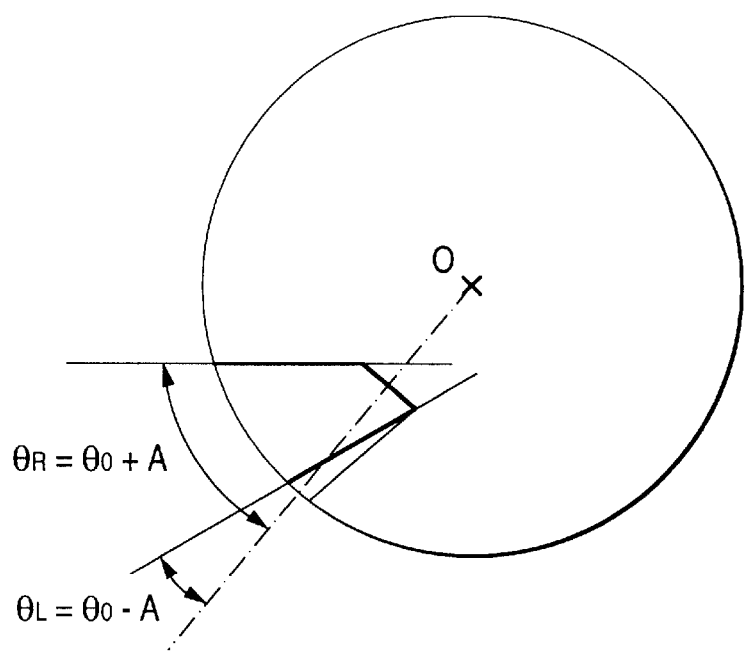

In FIG. 1B, $\theta_R$ is increased by angle A, while $\theta_L$ is decreased by angle A.

$$\therefore \theta_R = \theta_0 + A, \text{ and}$$

$$\theta_L = \theta_0 - A$$

If $\theta_0 < A$, $\theta_L$ takes a negative value. In what follows, $\theta_L$ will be expressed as being positive in a clockwise direction, and $\theta_R$ in an anticlockwise direction, as stated above.

Figure 2A:
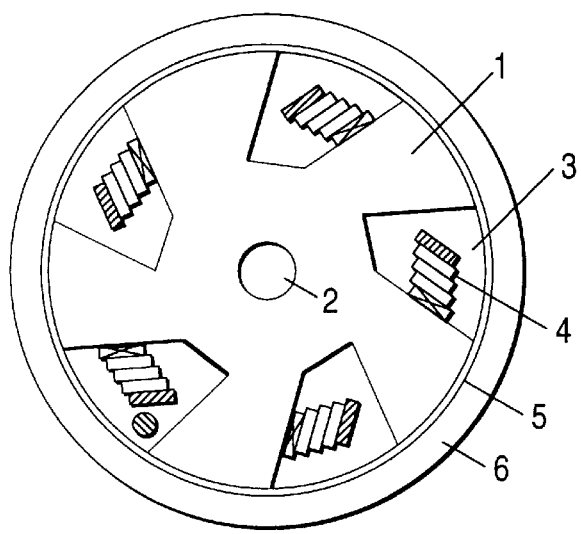
FIGS. 2A to 2C show cross sectional views of the optical fiber cable according to a first embodiment of the present invention.
Figure 2B:
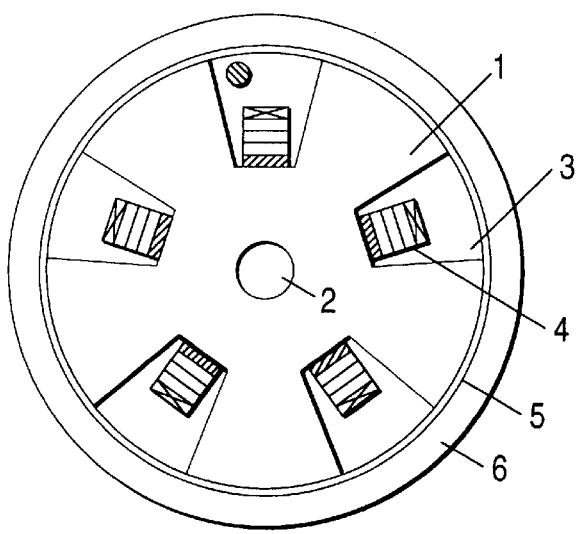
Figure 2C:
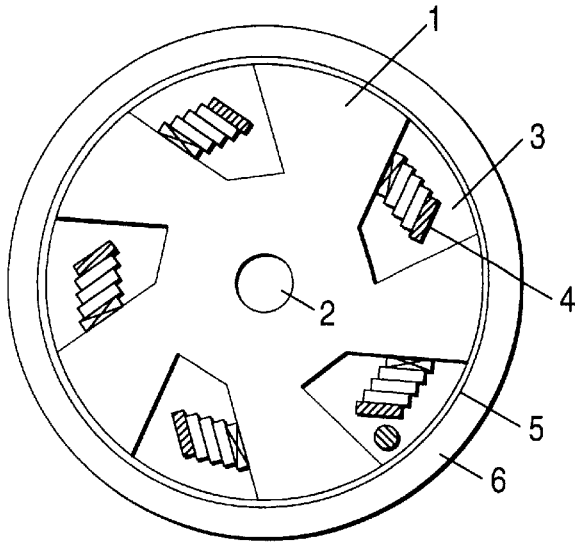

FIGS. 2A to 2C are cross-sectional views of the optical fiber cable according to a first embodiment of the present invention. FIGS. 2A, 2B, and 2C are views at a reverse portion, a helical portion, and another reverse portion, respectively, appearing in this order when the cable is seen from one end to the other in its axial direction. The groove from the position shown in FIG. 2A to the position shown in FIG. 2C makes a clockwise helix. Numeral 1 indicates a spacer; 2, a high-tensile member; 3, a groove; 4, an ribbon optical fiber; 5, a winding; and 6, a sheath. For the sake of better understanding of the positional relations of a plurality of ribbon optical fibers, the lowermost ribbon optical fiber is blacked out, and the uppermost ribbon optical fiber is marked with crossing lines. In order to indicate the positional relations of a plurality of grooves, a groove is marked with a solid circle.

As shown in FIG. 2B, both side walls of the grooves 3 are in symmetry, forming a nearly trapezoid, at the helical portion. At the reverse portions shown in FIG. 2A and 2C, the side wall with which the ribbon optical fiber 4 is in contact has a greater angle than at the helical portion. The angle of this side wall increases continuously and monotonously from the helical portion toward the reverse portion. At the reverse portion, the side wall with which the ribbon optical fiber 4 is not in contact has a smaller angle than at the helical portion, and the angle decreases continuously and monotonously from the helical portion toward the reverse portion. However, the angle of the wall with which the ribbon optical fiber is not in contact is not so important. What is required of this wall is that the angle should be enough to contain an imaginary virtual circle in the groove as hereinafter described.

The spacer 1 having grooves 3 is made of a thermoplastic resin, such as polyethylene. It has a high-tensile member 2 in its center. As can be seen from the drawings, the angles of the left and right side walls vary depending on the position in the axial direction of the optical fiber cable. A plurality of ribbon optical fibers 4 are stacked, and the stack is put in each groove 3. A winding 5 is applied around the spacer 1 with the ribbon optical fibers 4 in each groove thereof, and the wound member is covered with a sheath 6 made of a synthetic resin, e.g., polyethylene.

An example of the optical fiber cable according to the first embodiment of the present invention will be described.

In Example 1, the spacer 1 had an outer diameter of 11 mm. High-tensile steel wire having a diameter of 2.5 mm was used as a high-tensile member 2. The outer diameter of the cable inclusive of the sheath 6 was 14 mm. The reverse angle ø (the angle between adjacent reverse portions in the circumferential direction) and the reverse pitch (the distance between adjacent reverse portions) were set at 280° and 250 mm, respectively.

Figure 3A:
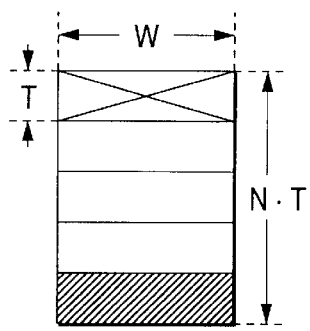
FIGS. 3A to 3B illustrate a stack of a plurality of ribbon optical fibers.

As shown in FIG. 3A, five ribbon optical fibers 4 were stacked and put in each groove. Each ribbon optical fiber 4 contained four coated optical fibers and had a width W of 1.1 mm and a thickness T of 0.32 mm. Accordingly, the stack made up of five ribbon optical fibers measured 1.1 mm in width and 1.6 mm in height. The height of the ribbon stack is represented by N·T, wherein N is the number of the stacked ribbon optical fibers (N·T=1.6 mm).

Figure 3B:
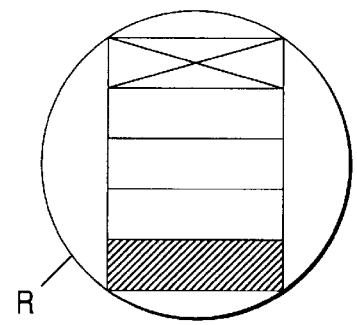

As shown in FIG. 3B, a virtual circle R about the ribbon stack (hereinafter simply referred to a circle R) is to have a diameter D represented equation:

$$D=(W^2+(N \cdot T)^2)^{1/2}$$

Figure 4A:
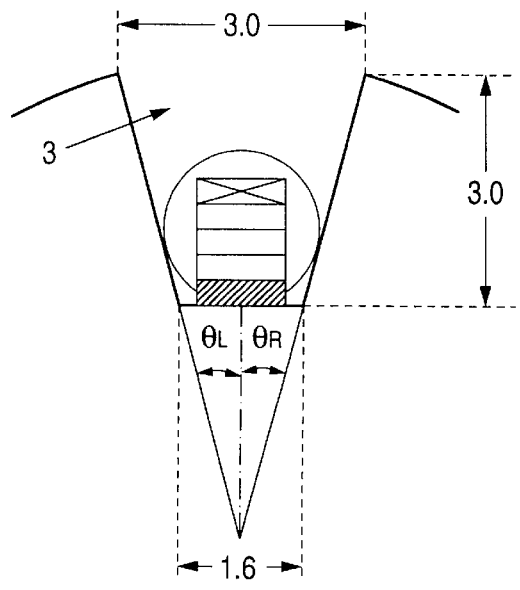
FIGS. 4A to 4B are views illustrative of the groove of the cable of FIG. 2.
Figure 4B:
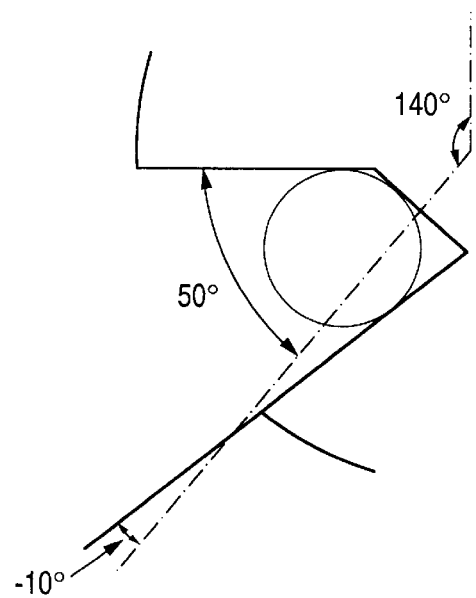

FIGS. 4A and 4B are illustrations of the groove of Example 1. FIG. 4A shows the cross section of the groove at a helical portion, in which the right and left side walls are symmetrical. The groove 3 had a width of 1.6 mm at the bottom and 3.0 mm at the opening and a height of 3.0 mm; and angles $\theta_L$ and $\theta_R$ were both 15°. That is, angle $\theta_0$ as referred to with reference to FIGS. 1A and 1B was 15°. While, in Example 1, the width of the groove at the bottom is equal to N·T of the ribbon stack, it can be greater than that.

FIG. 4B shows the cross section of the groove at a reverse portion. Because the reverse angle is 280°, the angle between the helical portion and the next reverse portion in the circumferential direction is 140°. Angle A as referred to with respect to FIGS. 1A and 1B was 35°. Therefore, angle $\theta_R$ of the right side wall was 15°+35°=50°. According to the preceding explanation for FIGS. 1A and 1B, angle $\theta_L$ of the left side wall is to be 15°−35°=−20°, but $\theta_L$ does not need to be set at −20°, because the left side wall, being outside the curvature of the groove, gives no direct influence to the behavior or angle of twist of the ribbon optical fibers. It should be noted, however, that $\theta_L$ must be such that allows circle R to be contained in the groove. Also not that a groove having too great a negative angle is difficult to form. From this viewpoint, angle $\theta_L$ was set at −10° in Example 1.

Figures 5, 6:
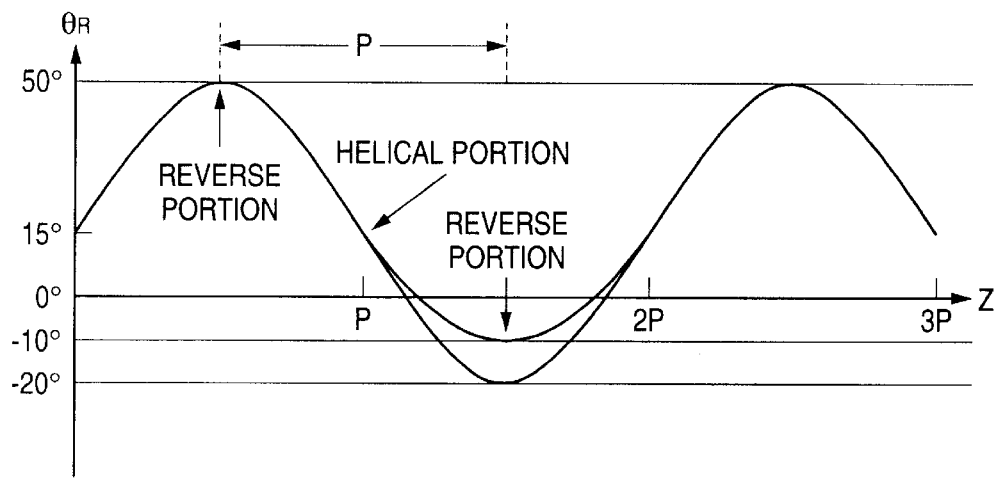
FIG. 5 is a graph showing variations of the angle of a side wall of a groove.
FIG. 6 is a table showing test results of Example 1 according to the first embodiment and comparative examples.

FIG. 5 are plots of variations of angle $\theta_R$ with respect to the longitudinal direction of the optical fiber cable of Example 1. As can be sen, the variation is a sino function, and $\theta_R$ is given from formula:

$$\theta_R=\theta_0+A \cdot \sin(180 \cdot (Z/P))$$

where Z is a coordinate of the longitudinal direction of the cable, taking a helical portion as a starting point 0; and P is a reverse pitch (i.e., the distance between two adjacent reverse portions).
Because $\theta_0$ is 15°, and A is 35° in Example 1, $$\theta_R=15+35 \cdot \sin(180 \cdot (Z/P)).$$

As depicted in FIG. 1A, $\theta_0$ corresponds to ½ of the angle formed by two radii touching circle R at the helical portion. In other words, $\theta_0$ is the angle of each of side walls that are on the two radii touching circle R at the helical portion. This angle is designated "and angle of a side wall at a helical portion" in the present invention. Accordingly, it is natural that the angle of the side wall at the reverse portion sometimes differs from the angle of the side wall at a portion except the reverse portion.

In the groove, a ribbon stack makes right angles with the bottom of the groove at a position making approximately 90° with a helical portion in the circumferential direction. That is, at this position the ribbon optical fibers become parallel to the line connecting the center of the bottom of the groove and the center of the spacer, and the top surface of the uppermost ribbon optical fiber separates from the right side wall. In other words, the uppermost ribbon optical fiber keeps contact with the right side wall within the part of the groove that extends from (i) the position making approximately 90° with a helical portion in the circumferential direction to (ii) the next reverse portion. What is significant is the slope of the side wall in this part of the groove. It is essentially required for $\theta_R$ to satisfy the above formula.

In the graph of FIG. 5, $\theta_R$ is greater than the sinθ wave in the part Z=P to ZP. This is because, in this part, the right side wall is positioned outside the curvature of the groove at the reverse portion, giving no direct influence upon the behavior and angle of twist of the ribbons. It should be considered that $\theta_R$ in this part must be enough to contain circle R.

Test results obtained from Example 1 and Comparative Examples 1 and 2 are shown in FIG. 6. It can be seen from FIG. 6 that Example 1 has a reduced transmission loss as compared with Comparative Examples 1 and 2 in which the angles of side walls are not varied (i.e., A=0) even though the size of the grooves is equal.

In Example 1, angle A was selected so as to fulfil the relationship:

$$(\phi/2)-90°-(\theta_0+A)=0$$

Angle A satisfying the above relationship is the most proper in that the ribbon stack is not twisted. However, the above relationship is not to limit angle A. Sufficient performance can be obtained when $$-15° \leq (\phi/2)-90°-(\theta_0+A) \leq 35°.$$

While Example 1 has been described with particular reference to the angle of the right side wall, the same description applies to the left side wall. The same applies to the other grooves as well.

Figure 7A:
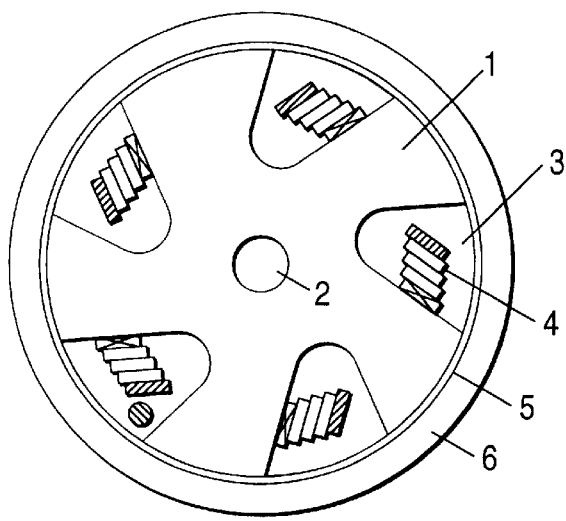
FIGS. 7A to 7C are cross sectional views of the optical fiber cable according to a second embodiment of the present invention.
Figure 7B:
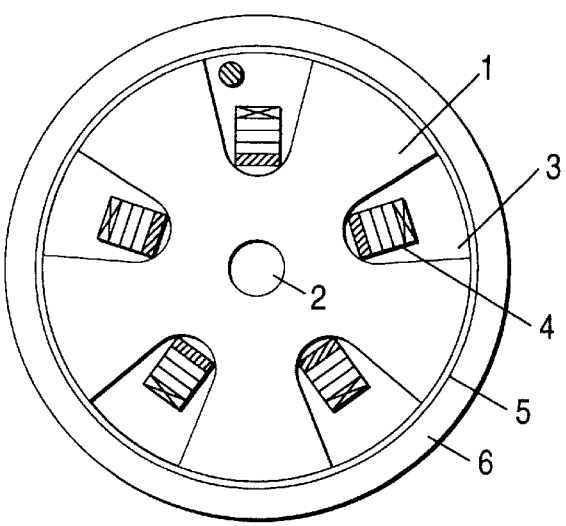
Figure 7C:
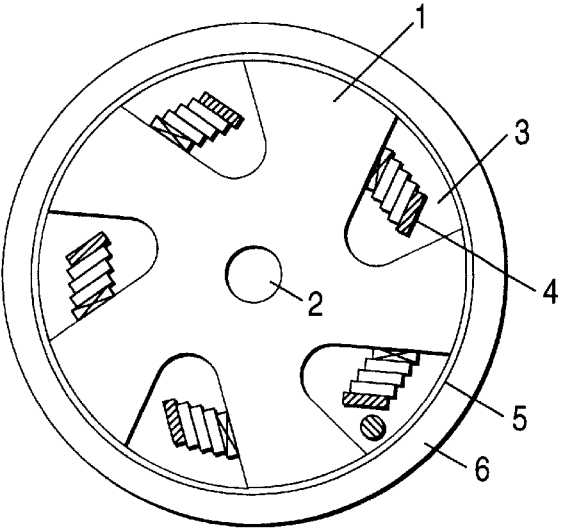

FIGS. 7A to 7C are cross-sectional views of the optical fiber cable according to a second embodiment of the present invention. In FIGS. 7A to 7C, the same reference numerals as used in the first embodiment shown in FIGS. 2A to 2C are given to the same members to avoid redundancies of explanation. Similarly to FIGS. 2A to 2C, FIGS. 7A to 7C are views at a reverse portion, a helical portion, and another reverse portion, respectively, appearing in this order when the cable is seen from one end to the other in its axial direction. The difference from the first embodiment lies in that the grooves have a rounded, arc-shaped bottom.

Figure 8A:
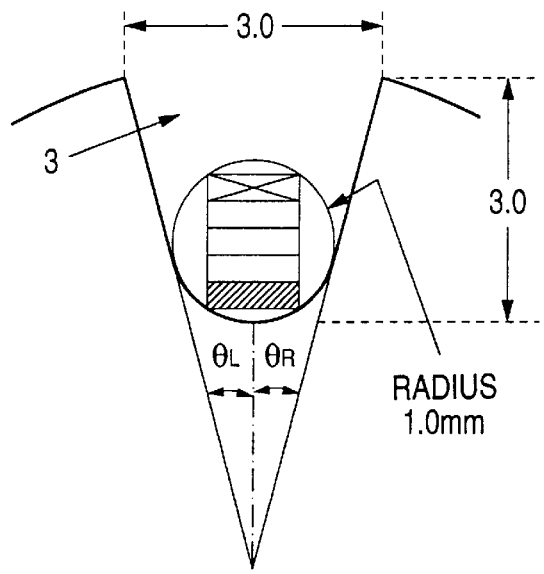
FIGS. 8A and 8B are views illustrative of the groove of the cable of FIG. 7.
Figure 8B:
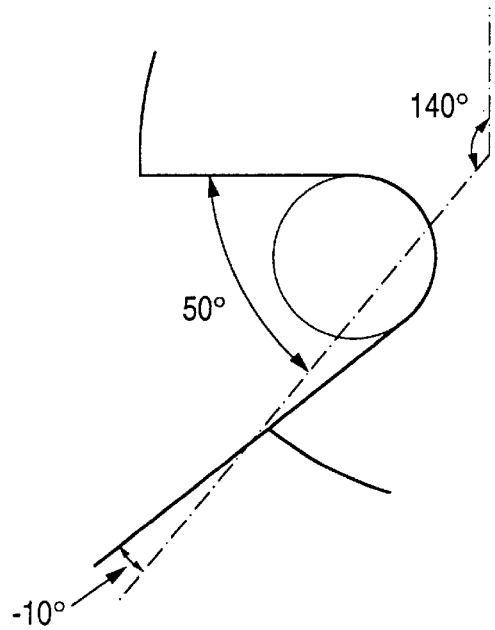

FIGS. 8A and 8B are illustrations of the groove of Example 2 according to the second embodiment. FIG. 8A illustrates the cross section of the groove at a helical portion, in which the right and left side walls are in symmetry. The curvature radius (R) of the arc at the bottom of the groove 3 can be either the same as or greater than the radius of virtual circle R.

In Example 2, a ribbon stack having the same dimensions as used in Example 1 was put in each groove. The groove 3 had a width of 3.0 mm at the opening and a height of 3.0 mm, and angles $\theta_L$ and $\theta_R$ were both 15°. The right and left side walls are connected at the bottom to form an arc. The curvature radius (R) of the arc at the bottom was substantially equal to that of circle R.

FIG. 8B is the cross section of the groove 3 at a reverse portion. Angles $\theta_L$ and $\theta_R$ at the reverse portion are the same as in FIGS. 4B and 5.

Figure 9A:
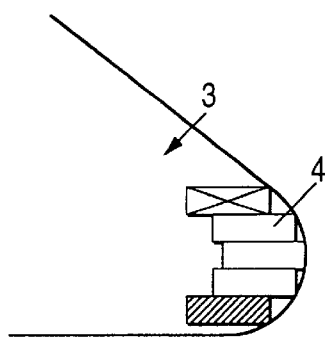
FIGS. 9A and 9B are views illustrative of the curvature radius of the bottom of a groove.
Figure 9B:
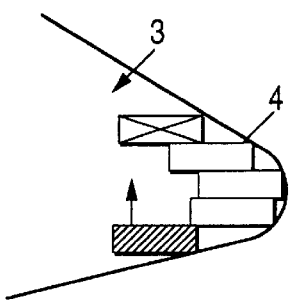
Figure 11A:
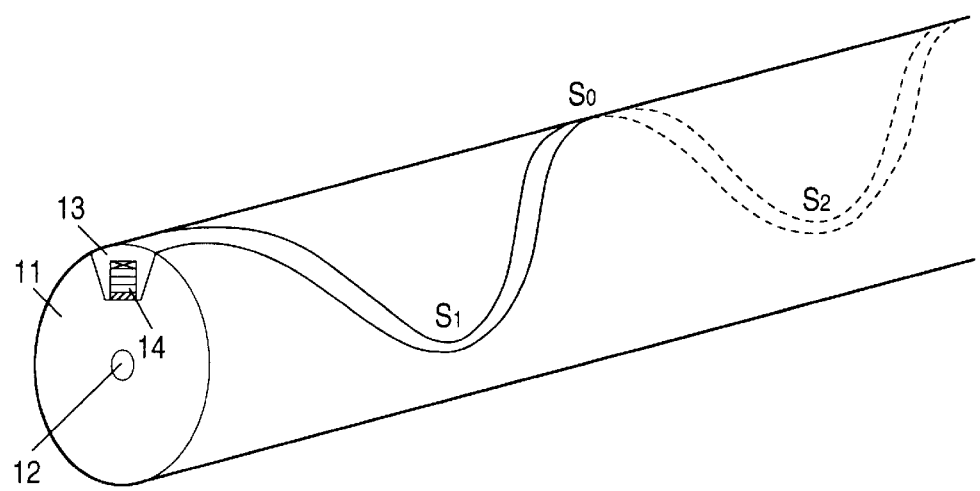
FIGS. 11A to 11C illustrate a conventional technique.
Figure 11B:
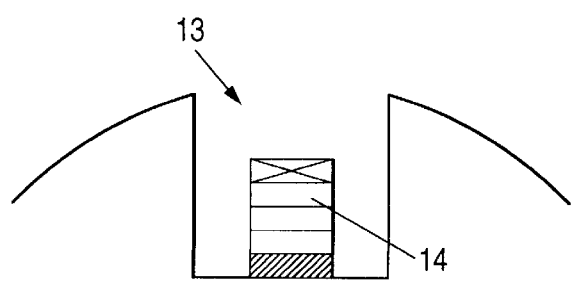
Figure 11C:
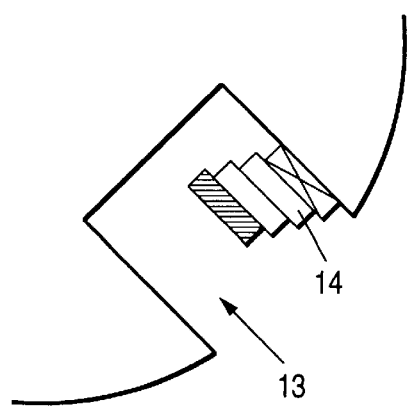

FIG. 9 is to explain a suitable curvature radius R of the bottom of the second embodiment. FIGS. 9A and 9B each show a cross section of a groove at the position where every ribbon optical fiber are arranged substantially in parallel with the radial direction of the spacer. This position is apart from the helical portion at about 90° in the circumferential direction. At this position every ribbon optical fiber 4 comes into contact with the bottom of the groove 3. The curvature radius R of the arc at the bottom was set at 1.0 mm in Example 2 (FIG. 9A) and 0.5 mm in Comparative Example 3 (FIG. 9B). In FIG. 9B in which the curvature radius R is 0.5 mm, the uppermost and lowermost ribbon optical fibers are apt to fall inward as indicated by the arrow, resulting in disordered arrangement, which will lead to an increase of loss. In FIG. 9A in which the curvature radius R is 1.0 mm (approximately equal to the radius of circle R), no disorder in arrangement occurs. As stated above, the curvature radius R of the bottom can be greater than the radius of circle R.

Test results obtained from Example 2 and Comparative Example 3 are shown in FIG. 10. Comparative Example 3 was designed to have the same angles of right and left side walls as Example 2 but a smaller curvature radius R at the bottom than Example 2. It is apparent from FIG. 10 that Example 2 exhibits satisfactory performance with a reduced transmission loss as compared with Comparative Example 3.

According to the present invention, the strain imposed on ribbon optical fibers can be minimized to reduce a transmission loss. Where the grooves have a specific section as specified in the present invention, disordered arrangement of a stack of a plurality of ribbon optical fibers can be prevented thereby to reduce a transmission loss.

What is claimed is:

1. An optical fiber cable comprising:

a cylindrical spacer having on its surface holical grooves reversing their direction at a given pitch; and a stack of ribbon optical fibers received in said groove; wherein:

the reverse angle ø of the groove is $210° \leq ø \leq 330°$;

the groove has a size to contain a virtual circle therein whose diameter D is represented by equation:

$$D=(W^2+(N \cdot T)^2)^{1/2}$$

where W is the width of the ribbon optical fiber, T is the thickness of the ribbon optical fiber, and N is the number of the ribbon optical fibers stacked in a groove;

the angle θ formed between each side walls of the groove and a line connecting the center of the bottom of the groove and the center of the spacer varies periodically; and the angle θ of the side wall on the inner side of the curvature of the center of the groove increases continuously and monotonously at least over the part extending from a position distant from a helical portion between adjacent reverse portions at approximately 90° in a circumferential direction to the next reverse portion.

2. An optical fiber cable according to claim 1, wherein the angle θ of said side wall on the inner side of the curvature of the center of the groove satisfies the relationship:

$$θ=θ_0+A \cdot \sin(180 \cdot (Z/P))$$

where $θ_0$ is the angle θ at a helical portion, P is a reverse pitch (i.e., the distance between adjacent reverse portions), and Z is a coordinate of the longitudinal direction of the cable, taking a helical portion as a starting point 0, at least over the part extending from a position distant from a helical portion at approximately 90° in a circumferential direction to the next reverse portion.

3. An optical fiber cable according to claim 1, wherein the groove at a helical portion has a nearly trapezoidal cross section whose width B at the bottom satisfies the relationship:

$$B \geq N \cdot T.$$

4. An optical fiber cable according to claim 2, wherein the groove at a helical portion has a nearly trapezoidal cross section whose width B at the bottom satisfies the relationship:

$$B \geq N \cdot T.$$

5. An optical fiber cable according to claim 1, the bottom of the groove is part of a circle touching both right and left side walls, and the diameter C of said circle satisfies the relationship:

$$C \geq (W^2+(N \cdot T)^2)^{1/2}.$$

6. An optical fiber cable according to claim 2, the bottom of the groove is part of a circle touching both right and left side walls, and the diameter C of said circle satisfies the relationship:

$$C \geq (W^2+(N \cdot T)^2)^{1/2}.$$

7. An optical fiber cable according to claim 1, wherein the reverse angle ø of the groove is $260° \leq ø \leq 290°$.

8. An optical fiber cable according to claim 7, wherein the reverse angle ø of the groove is $270° \leq ø \leq 280°$.

* * * * *